United States Patent
Cengiz et al.

(10) Patent No.: US 10,643,182 B2
(45) Date of Patent: May 5, 2020

(54) RESUME EXTRACTION BASED ON A RESUME TYPE

(71) Applicant: Oracle International Corporation, Redwood Shores, CA (US)

(72) Inventors: Yasin Cengiz, Irvine, CA (US); Kent A. Spaulding, Portland, OR (US); Reza B'Far, Irvine, CA (US); Xin Yin, Foster City, CA (US); Mario S. Maldonado, New York, NY (US)

(73) Assignee: Oracle International Corporation, Redwood Shores, CA (US)

( * ) Notice: Subject to any disclaimer, the term of this patent is extended or adjusted under 35 U.S.C. 154(b) by 466 days.

(21) Appl. No.: 15/072,256

(22) Filed: Mar. 16, 2016

(65) Prior Publication Data

US 2017/0270484 A1 Sep. 21, 2017

(51) Int. Cl.
*G06Q 10/10* (2012.01)
*G06Q 10/06* (2012.01)
(Continued)

(52) U.S. Cl.
CPC ..... *G06Q 10/1053* (2013.01); *G06F 16/2455* (2019.01); *G06N 7/005* (2013.01);
(Continued)

(58) Field of Classification Search
CPC .. G06Q 10/105; G06Q 10/1053; G06N 20/10; G06N 20/00; G06N 7/005; G06F 16/2455
(Continued)

(56) References Cited

U.S. PATENT DOCUMENTS

| | | | |
|---|---|---|---|
| 6,874,002 B1* | 3/2005 | Peleus | G06F 16/313 707/812 |
| 8,117,024 B2* | 2/2012 | Dane | G06F 17/271 704/9 |

(Continued)

OTHER PUBLICATIONS

Yu et al. (Yu, Kun; Guan, Gang; Zhou, Ming), "Resume Information Extraction with Cascaded Hybrid Model," Proceeding of the 43rd Annual Meeting of the ACL; Association for Computation Linguistics, pp. 499-506, Jun. 2005. (Year: 2005).*

(Continued)

*Primary Examiner* — Jonathan P Ouellette
(74) *Attorney, Agent, or Firm* — Invoke

(57) ABSTRACT

Résumé value extraction based on a résumé type is disclosed. An analysis model, for analyzing a résumé, is selected based on a résumé type of the résumé. An example of a résumé type is a job industry associated with the résumé. Different analysis models are used to analyze résumés corresponding to different résumé types. The analysis model is used to identify résumé values, in the résumé, that correspond to résumé attributes associated with the résumé type. Additionally or alternatively, the analysis model is used to identify segments, in the résumé, that correspond to segment types associated with the résumé type. After a segment type of a particular segment is identified, résumé values within the particular segment are analyzed based on the segment type of the particular segment.

19 Claims, 4 Drawing Sheets

(51) Int. Cl.
G06Q 30/08 (2012.01)
G06Q 30/02 (2012.01)
G06Q 10/00 (2012.01)
G06N 7/00 (2006.01)
G06N 20/00 (2019.01)
G06F 16/2455 (2019.01)
G06N 20/10 (2019.01)

(52) U.S. Cl.
CPC ............. *G06N 20/00* (2019.01); *G06N 20/10* (2019.01); *G06Q 10/105* (2013.01)

(58) Field of Classification Search
USPC .................................................. 705/1.1–912
See application file for complete search history.

(56) References Cited

U.S. PATENT DOCUMENTS

| | | | | |
|---|---|---|---|---|
| 2005/0286772 | A1* | 12/2005 | Albertelli | G06K 9/6292 382/224 |
| 2008/0063279 | A1* | 3/2008 | Vincent | G06K 9/00463 382/182 |
| 2011/0184958 | A1* | 7/2011 | Krishnamoorthy | G06Q 30/02 707/749 |
| 2012/0134589 | A1* | 5/2012 | Reddy | G06K 9/6255 382/182 |
| 2014/0122355 | A1* | 5/2014 | Hardtke | G06Q 10/105 705/321 |
| 2016/0171446 | A1* | 6/2016 | Gandino-Saadein | G06Q 10/1053 705/321 |
| 2016/0232160 | A1* | 8/2016 | Buhrmann | G06F 17/2247 |
| 2016/0379170 | A1* | 12/2016 | Pande | G06Q 10/06 705/321 |
| 2017/0193089 | A1* | 7/2017 | Fang | G06F 16/3344 |
| 2017/0286914 | A1* | 10/2017 | Fang | G06Q 10/1053 |
| 2017/0300565 | A1* | 10/2017 | Calapodescu | G06F 16/353 |

OTHER PUBLICATIONS

"Talemetry Apply: Employment Application Software," 10 pages; retreived from http://talemetry.com/recruiting-tools-products/apply-online-job-application-module/ (Copyrighted 2015; Captured Apr. 18, 2016).

"Sovren Resume Parser," 3 pages; retrieved from http://www.sovren.com/products/ (Copyrighted 2016; Captured Apr. 18, 2016).

Greaves, "Relation Extraction using Distant Supervision, SVMs, and Probabilistic First Order Logic," Thesis for School of Computer Science, Carnegie Mellon University, Pittsburgh, PA (May 2014), 62 pages; retrieved from http://reports-archive.adm.cs.cmu.edu/anon/2014/CMU-CS-14-128.pdf.

* cited by examiner

RESUME EXTRACTION BASED ON A RESUME TYPE

TECHNICAL FIELD

The present disclosure relates to résumé extraction. In particular, the present disclosure relates to résumé extraction based on a résumé type.

BACKGROUND

Organizations review a large number of résumé to identify suitable candidates for job openings or otherwise manage human resources. Each résumé may comprise information such as a person's educational background, work experience, and qualifications. Each résumé may present the information in a different format and/or organization.

Many applications (such as human resource applications) use schemas to store, organize, and manage information of candidates and/or other personnel. A schema includes one or more data fields, each storing a specific type of information. For example, one data field may store a candidate's name, and another data field may store a candidate's school. A user may need to manually input candidate information from a résumé into the corresponding data fields used by an application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RÉSUMÉ EXTRACTION SYSTEM ARCHITECTURE
3. EXTRACTING RÉSUMÉ VALUES BASED ON A RÉSUMÉ TYPE
4. EXAMPLE EMBODIMENT
5. MISCELLANEOUS; EXTENSIONS
6. HARDWARE OVERVIEW

1. General Overview

One or more embodiments include selecting an analysis model, for analyzing a résumé, based on a résumé type of the résumé. An example of a résumé type is a job industry associated with the résumé. Different analysis models are used to analyze résumés corresponding to different résumé types. The analysis model is used to identify résumé values, in the résumé, that correspond to data fields (also referred to herein as "résumé attributes") associated with the résumé type. Additionally or alternatively, the analysis model is used to identify segments, in the résumé, that correspond to segment types associated with the résumé type. After a segment type of a particular segment is identified, résumé values within the particular segment are analyzed based on the segment type of the particular segment.

Different analysis models may include different algorithms. Examples of algorithms include a naïve Bayes classifier, probabilistic model, support vector machine (SVM), maximum entropy classifier, rule-based approach, dictionary look-up, and regular expression (regex) matching. Additionally or alternatively, different analysis models may apply different parameters in a same algorithm. As an example, two analysis models may use a dictionary look-up algorithm. However, the two analysis models may apply different dictionaries in the same algorithm. Different dictionaries may be associated with different résumé types. As another example, two analysis models may use a naïve Bayes classifier. However, the two analysis models may apply different frequency tables in the same algorithm. One frequency table may be generated from a set of résumés corresponding to a particular résumé type, while the other frequency table may be generated from a different set of résumés corresponding to a different résumé type.

2. Résumé Extraction System Architecture

Figure 1:
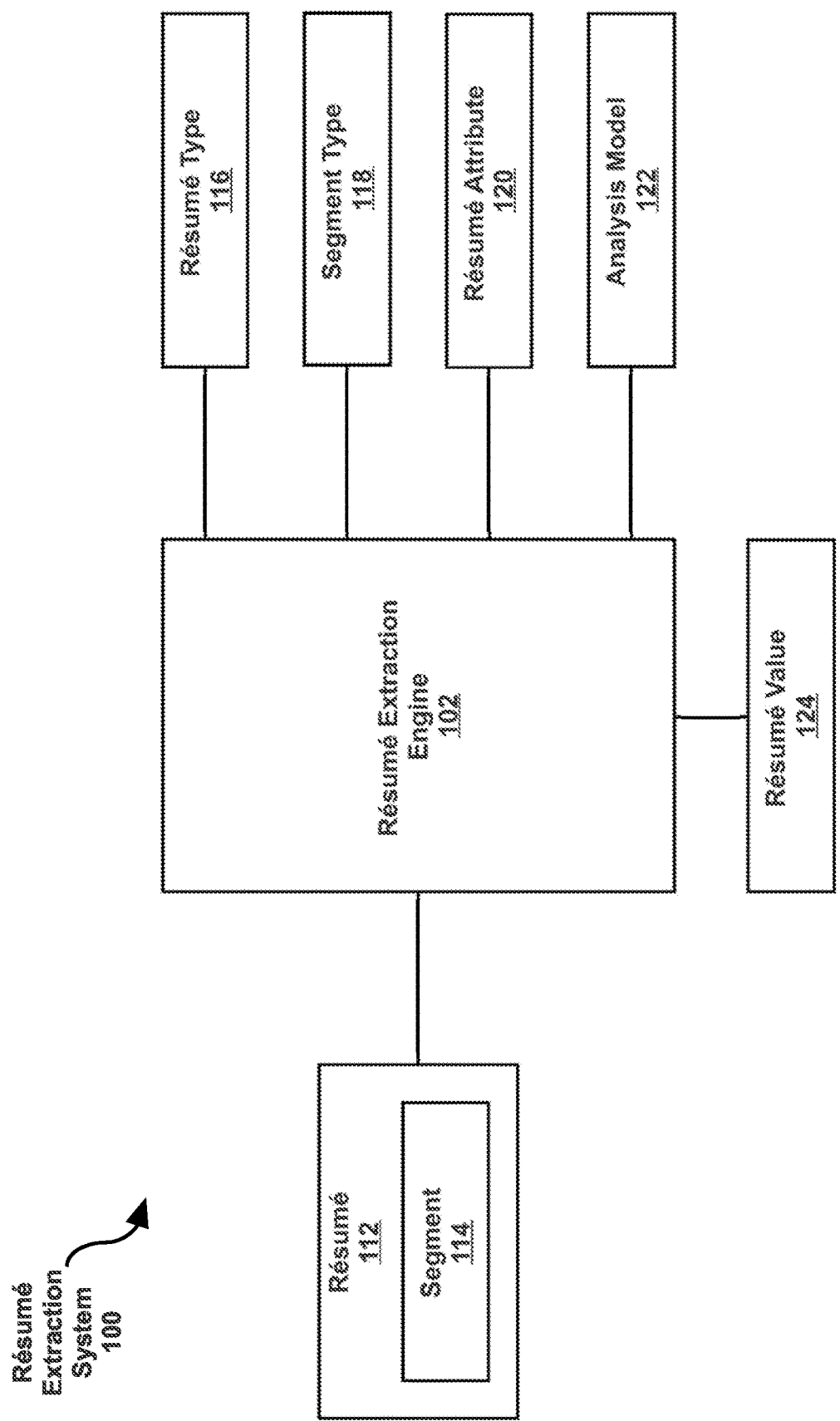
FIG. 1 illustrates a résumé extraction system, in accordance with one or more embodiments.

FIG. 1 illustrates a résumé extraction system 100 in accordance with one or more embodiments. As illustrated, résumé extraction system 100 includes a résumé extraction engine 102. In one or more embodiments, résumé extraction system 100 may include more components than the component illustrated in FIG. 1. The component illustrated in FIG. 1 may be local to or remote from other components used by résumé extraction system 100. The component illustrated in FIG. 1 may be implemented in software and/or hardware and may be distributed over one or more applications and/or machines. Operations described with respect to the component illustrated in FIG. 1 may instead be performed by another component.

In one or more embodiments, résumé extraction system 100 includes one or more data repositories (not shown). A data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

A data repository may be implemented or may execute on the same computing system as résumé extraction engine 102. Alternatively or additionally, the data repository may be implemented or executed on a separate computing system than résumé extraction engine 102. The data repository may be communicatively coupled to résumé extraction engine 102 via a direct connection or via a network.

Data sets describing résumé 112, segment 114, résumé type 116, segment type 118, résumé attribute 120, analysis model 122, and résumé value 124 may be implemented across any component used by résumé extraction system 100.

In one or more embodiments, a résumé 112 includes information relating to a person's educational background, work experience, and qualifications. Different résumés 112 may present the information according to different formats and/or organizations.

A résumé may be associated with one or more résumé types 116. A résumé type 116 is a category of résumés 112 associated with a common attribute. As an example, a résumé type 116 may be a job industry associated with a résumé. One group of résumés may be associated with the résumé type, "Information Technology." Another group of résumé may be associated with the résumé type, "Arts and Design."

As another example, a résumé type 115 may be a geographical region associated with a résumé. The geographical region may be based on the location of the person whose experiences are described in the résumé. Additionally or alternatively, the geographical region may be based on the location of the job for which the résumé is being submitted. As another example, a résumé type 116 may be a language used in a résumé, such as English, French, and Chinese.

In one or more embodiments, a segment 114 includes at least a subset of the information in a résumé 112. A segment type I 18 associated with the segment 114 is a common topic and/or characteristic associated with the subset of information included in the segment 114. As an example, a segment 114 of the segment type 118, "Education," may include information on a person's school of graduation, year of graduation, and grade point average. Other examples of segment types 118 include "Work Experience," "Skills," "Publications," and "Portfolio."

A segment may begin with a heading. A heading may specify a topic associated with the segment. The heading may be presented using a different font and/or format. As an example, a heading may be expressed as capitalized text. As another example, a heading may be expressed as underlined text.

Different segment types 118 may be associated with different résumé types 116. As an example, a segment of the segment type. "Technical Skills," may be associated with résumés in the software industry, but not résumés in the art industry. In contrast, a segment of the segment type, "Art Shows," may be associated with résumés in the art industry, but not résumés in the software industry.

In one or more embodiments, a résumé attribute 120 is a data field within a schema used by an application or system to organize information. Each résumé attribute 120 within a schema stores a specific type of information. As an example, one résumé attribute 120 may be "First Name," and another résumé attribute 120 may be "Last Name." Information on a person's first name would be stored in association with the "First Name" résumé attribute 120, rather than the "Last Name" résumé attribute 120.

Different résumé attributes 120 may be associated with different résumé types 116. As an example, a résumé attribute may correspond to a programming language. The résumé attribute may be associated with résumés in the software industry, but not résumés in the art industry. Another résumé attribute may correspond to a forum for an art exhibit. The résumé attribute may be associated with résumés in the art industry, but not résumés in the software industry.

Different résumé attributes 120 may be associated with different segment types 118. As an example, a résumé attribute may store a person's email address. The résumé attribute may be associated with a segment of the segment type, "Personal Information," but not another segment of the résumé. Another résumé attribute may store a person's year of graduation. The résumé attribute may be associated with a segment of the segment type, "Education," but not another segment of the résumé.

In one or more embodiments, a résumé value 124 is a value that is extracted from a résumé. A résumé value 124 may map to a résumé attribute 120. As an example, a résumé may state, "University of California, May 2006." One résumé value may be "University of California" The résumé value may map to a résumé attribute, "Undergraduate School." Another résumé value may be "May 2006." The résumé value may map to a résumé attribute, "Graduation Date."

In one or more embodiments, an analysis model 122 is used to determine a résumé type 116 of a résumé 112. Additionally or alternatively, analysis model 122 is used to determine a segment type 118 of a segment 114 of a résumé 112. Additionally or alternatively, analysis model 122 is used to identify a résumé value 124 corresponding to a résumé attribute 120.

Analysis model 122 includes one or more algorithms for analyzing a résumé 112. Examples of algorithms include a naïve Bayes classifier, probabilistic model, support vector machine (SVM), maximum entropy classifier, rule-based approach, dictionary look-up, and regular expression (regex) matching.

An algorithm accepts an input, processes the input using one or more parameters, and returns an output that is used to analyze a résumé. As an example, a dictionary look-up algorithm may accept words of a résumé as input. The dictionary look-up algorithm may process the words of the résumé using a specified dictionary. The dictionary look-up algorithm may return an output indicating whether a word of the résumé matches a word of the specified dictionary. An analysis model may use a match between a word of the résumé and a word of the specified dictionary to identify a résumé type, a segment type, and/or a résumé value. Different analysis models may apply a dictionary look-up algorithm using different dictionaries. One dictionary may include words related to the software industry, while another dictionary may include words related to the arts industry.

As another example, a regression algorithm may accept features of a résumé as input. Features may include, for example, a number of line dividers in the résumé, and a number of capitalized words in the résumé. The regression algorithm may process the features of the résumé using a set of weights. Each weight may be applied to the corresponding feature. The regression algorithm may output a sum of the weighted features, which indicates a likelihood that the résumé is associated with a particular résumé type. An analysis model may use the output to determine whether the résumé is of the particular résumé type. Different analysis models may apply a regression algorithm using different sets of weights.

As another example, a naïve Bayes classifier may accept words of a résumé as input. The naïve Bayes classifier may process the words of the résumé using frequency tables. The naïve Bayes classifier may apply relevant values of the frequency tables to Bayes Theorem to output a likelihood that the résumé is associated with a particular résumé type. An analysis model may use the output to determine whether the résumé is of the particular résumé type. Different analysis models may apply a naïve Bayes classifier using different frequency tables.

A parameter used in an algorithm (such as, a set of weights in a regression model, or frequency tables in a naïve Bayes classifier) may be determined based on a training set of résumés. Each résumé in the training set has a known characteristic. The known characteristic may be a résumé type, a segment, type of a segment, and/or a résumé value corresponding to a particular résumé attribute. The known characteristic may be specified via user input. As an example, for training a naïve Bayes classifier to classify résumé types, a user may specify a résumé type of each résumé in a training set. As another example, for training another naïve Bayes classifier to identify résumé values corresponding to résumé attributes, a user may identify a set of résumé values in a training set of résumés. The user may specify the résumé attribute of each identified résumé value.

The training set of résumés (including the known characteristics) is input to the algorithm to determine one or more parameters. The parameters are determined such that, when the algorithm applies the parameters to the training set of résumés, the algorithm returns results that best matches the known characteristics. The process of determining the parameters used in an algorithm is also referred to herein as "machine learning."

Parameters of different analysis models may be determined based on different training sets of résumés. Parameters determined based on different training sets may have different values. As an example, machine learning may be used to generate an analysis model for analyzing résumés in the software industry and another analysis model for analyzing résumés in the art industry. Both analysis models may include a naïve Bayes classifier, which uses frequency tables as parameters. The frequency tables of each analysis model may be determined based on a particular training set of résumés.

The frequency tables, for use in the analysis model for résumés in the software industry, may be determined based on a training set that only includes résumés in the software industry. Words such as "Java" and "Ruby on Rails" may appear with a high frequency in the résumés in the software industry. Frequency tables generated from the résumés in the software industry may indicate a high frequency of occurrence of these words.

Meanwhile, the frequency tables, for use in the analysis model for résumés in the art industry, may be determined based on a training set that only includes résumés in the art industry. Words such as "paint" and "color" may appear with a high frequency in the résumés in the art industry. Frequency tables generated from the résumés in the art industry may indicate a high frequency of occurrence of these words. Hence, the frequency tables of the two analysis models would have different values.

In one or more embodiments, résumé extraction engine 102 refers to hardware and/or software configured to perform operations described herein for extracting a résumé value corresponding to a résumé attribute based on a résumé type. The résumé extraction engine 102 applies an analysis model 122 to a résumé 112 to extract résumé values 124. Examples of operations for extracting a résumé value 124 are described below with reference to FIG. 2.

In an embodiment, résumé extraction engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and/or a personal digital assistant ("PDA").

3. Extracting Résumé Values Based on a Résumé Type

Figure 2:
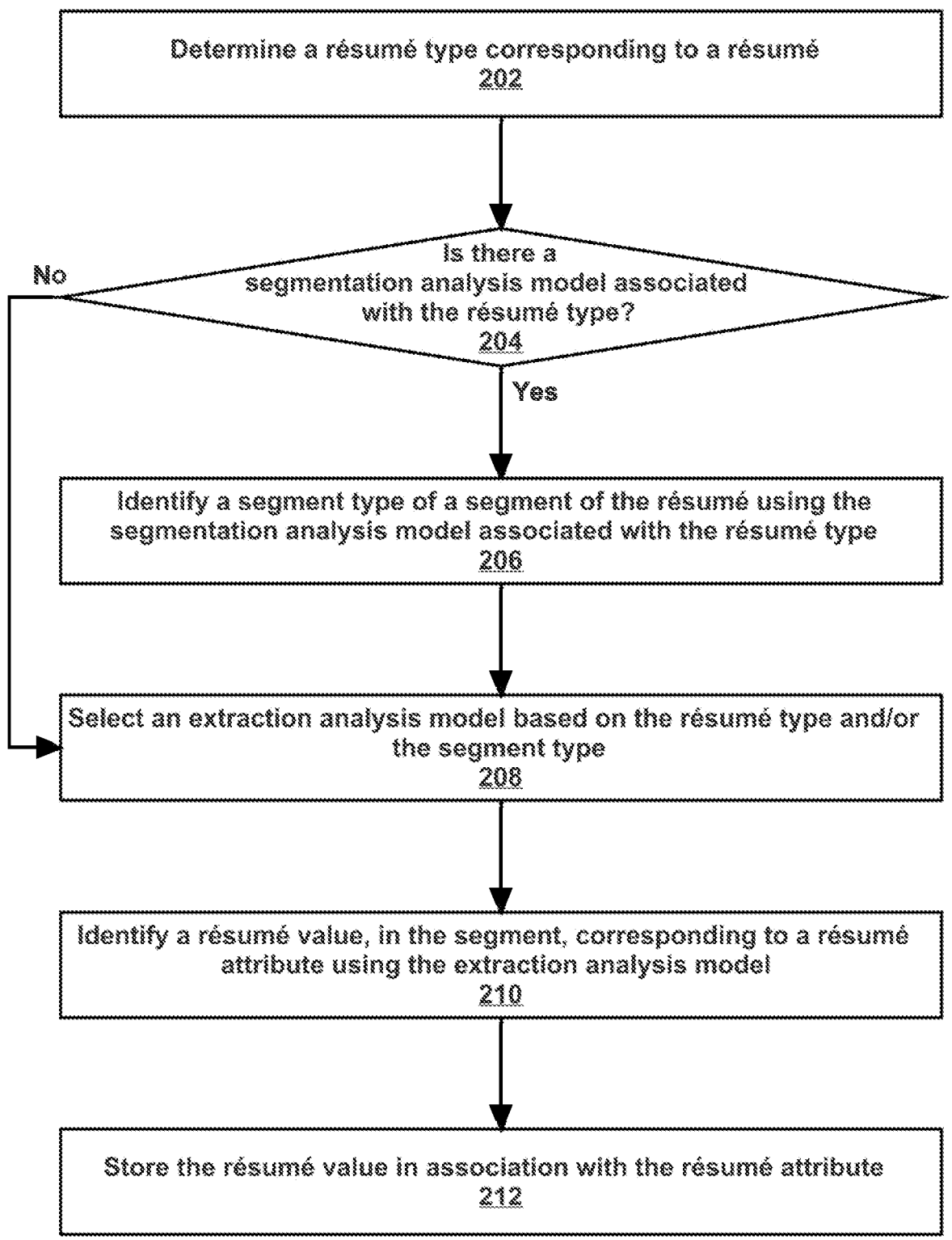
FIG. 2 illustrates an example set of operations for extracting a résumé value, corresponding to a résumé attribute based on a résumé type, in accordance with one or more embodiments.

FIG. 2 illustrates an example set of operations for extracting a résumé value based on a résumé type, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A résumé extraction engine may obtain the résumé from an application. Alternatively the résumé extraction engine may receive the résumé as user input via a user interface. One or more embodiments include determining a résumé type corresponding to a résumé (Operation 202). The résumé analysis engine may determine the résumé type based on an explicit identification of the résumé type by an application or a user that submits the résumé.

Alternatively, the résumé analysis engine may determine the résumé type based on a profile of a user corresponding to the résumé. The profile indicates the type of jobs that the user is seeking. The résumé analysis engine maps the job type to a résumé type.

Alternatively, the résumé analysis engine may determine the résumé type based on a job posting for which the résumé is being submitted. The résumé analysis engine determines a job type of the job posting. The résumé analysis engine maps the job type to a résumé type.

In an embodiment, the résumé extraction engine applies an analysis model to keywords and/or features of the résumé to determine the résumé type. The résumé extraction engine may determine keywords of the résumé based on natural language processing (NLP). The résumé extraction engine tokenizes the résumé by partitioning a stream of text into words, phrases, symbols, or other meaningful elements called tokens. The résumé extraction engine parses the tokens to identify relationships between the tokens based on sentence structure, the sequence of tokens in the text, the grammar used in the text, and other textual information. Based on the tokenization and/or parsing, the résumé extraction engine identifies a root of a word in the résumé, identifies a synonym of a word, disambiguates a meaning of a word, discards common words (such as, "a" and "the"), or otherwise interprets the text.

The résumé extraction engine may identify keywords of the résumé as the tokens, word roots, and synonyms, determined via NLP. Additionally or alternatively, the résumé extraction engine may identify keywords as lists of consecutive tokens or words in the résumé. As an example, a résumé may state, "Emily Wong. Boston University," Keywords of the résumé may include, "Emily Wong," "Wong Boston," and "Boston University."

The résumé extraction engine may identify features of the résumé. The features may be associated with the words, layout, format, organization, or other characteristics of the résumé. Examples of features include the number of capitalized words in the résumé, the number of characters in the résumé, and the number of line dividers in the résumé.

In an embodiment, a résumé extraction engine applies a naïve Bayes classifier to a particular résumé to determine a résumé type of the particular résumé. The naïve Bayes classifier is applied to a statistical distribution of keywords of the particular résumé. The statistical distribution of keywords may represent: the keywords associated with the particular résumé, the sequence of the keywords, and/or the number of occurrences of the keywords. The statistical distribution of keywords of the particular résumé is represented by a vector x.

The naïve Bayes classifier determines a résumé type of the particular résumé using frequency tables generated based on a training set of résumés. The résumé type of each résumé in the training set is known. A statistical distribution of keywords of each résumé is also known.

The likelihood that the particular résumé, with the statistical distribution of keywords x, corresponds to a particular résumé type C is:

$$\frac{p(C) \times p(x \mid C)}{p(x)}$$

where:
p(C) is (a) the number of résumés of résumé type C in the training set, over (b) the number of résumés in the training set;
p(x|C) is (a) the number of résumés with the same statistical distribution of keywords x and of résumé type C in the training set, over (b) the number of résumés of résumé type C in the training set; and
p(x) is (a) the number of résumés with the same statistical distribution of keywords x in the training set, over (b) the number of résumés in the training set.

If the likelihood that the particular résumé corresponds to résumé type C satisfies a specified criterion, then the résumé extraction engine determines the particular résumé corresponds to résumé type C. As an example, if the likelihood that a particular résumé corresponds to résumé type C is greater than a threshold value, then a résumé extraction engine may determine that the particular résumé corresponds to résumé type C. As an example, if the likelihood that a particular résumé corresponds to résumé type C is greater than the likelihood that the particular résumé corresponds to any other résumé type, then a résumé extraction engine may determine that the particular résumé corresponds to résumé type C.

As an example, a particular résumé may have the keywords, "computer science" and "Java Ruby." A training set used to generate a naïve Bayes classifier may include the following:
one-thousand (1,000) résumés in the training set;
one-hundred (100) résumés of résumé type, "Software";
eighty (80) résumés with the same keywords, "computer science" and "Java Ruby"; and
fifty (50) résumés with the same keywords, "computer science" and "Java Ruby," and of résumé type, "Software."

Based on the training set, frequency tables may indicate:

$$p(\text{résumé type "Software"}) = \frac{100}{1{,}000} = 0.10;$$

p(keywords "computer science" and "Java Ruby" |

$$\text{résumé type "Software"}) = \frac{50}{100} = 0.50;$$

and p(keywords "computer science" and $$\text{"Java Ruby"}) = \frac{80}{1{,}000} = 0.08.$$

Continuing the example, a résumé extraction engine may compute a likelihood that the particular résumé is of résumé type "Software" as follows:

$$= \frac{[p(\text{résumé type "Software"}) \times p(\text{keywords "computer science" and "Java Ruby"} \mid \text{résumé type "Software"})]}{p(\text{keywords "computer science" and "Java Ruby"})}$$

$$= \frac{[0.10 \times 0.50]}{[0.08]}$$

$$= 0.625.$$

The résumé extraction engine may compute likelihoods that the particular résumé corresponds to other résumé types in a similar fashion. The résumé extraction engine may determine that the likelihood that the particular résumé is of résumé type "Software" is higher than the likelihoods that the particular résumé is of any other résumé types. The résumé extraction engine may determine that the particular résumé is of résumé type "Software."

In an embodiment, a résumé extraction engine applies a regression model to a particular résumé to determine a résumé type of the particular résumé. The regression model is applied to a set of features of the particular résumé, which is represented by a vector x.

The regression model determines a résumé type of the particular résumé using weights generated based on a training set of résumés. The résumé type of each résumé in the training set is known. A set of features of each résumé in the training set is also known.

For a particular résumé type C, each résumé in the training set is assigned a résumé type indicator, indicating whether the résumé corresponds to résumé type C. For example, a résumé type indicator of "1" may indicate that a résumé corresponds to résumé type C, and a résumé type indicator of "0" may indicate that a résumé does not correspond to résumé type C. The résumé type indicator of each résumé in the training set is plotted against the features of each résumé on a graph. A set of weights, represented by a vector $w=[w_1, w_2, \ldots]$ is determined such that a linear (or logistic) curve that is a function of the weights best fits the graph of résumé type versus features.

A score indicating a likelihood that the particular résumé, with the features x, corresponds to résumé type C is a dot product of w and x, as follows:

$$w \cdot x = w_1 x_1 + w_2 x_2 + \ldots$$

Each weight in vector w is applied to a corresponding feature to obtain a feature value, such as $w_1 x_1$ and $w_2 x_2$. The sum of the feature values is a score indicating a likelihood that the particular résumé corresponds to résumé type C.

If the score satisfies a specified criterion, then the résumé extraction engine determines the particular résumé corresponds to résumé type C. As an example, if the score is greater than a threshold value, then a résumé extraction engine may determine that the particular résumé corresponds to résumé type C. As another example, if the score indicating a likelihood that the particular résumé corresponds to résumé type C is greater than the score associated with any other résumé type, then a résumé extraction engine may determine that the particular résumé corresponds to résumé type C.

Additionally or alternatively, the résumé extraction engine may apply other analysis models to determine a résumé type corresponding to the résumé.

A résumé extraction engine may determine multiple résumé types corresponding to the résumé. As an example, a résumé extraction engine may determine a job industry and a language associated with the résumé. The job industry would be one résumé type of the résumé, and the language would be another résumé type of the résumé.

One or more embodiments include determining whether there is a segmentation analysis model associated with the résumé type (Operation 204). The résumé extraction engine retrieves a set of rules from a data repository. The set, of rules indicates a mapping between segmentation analysis models and résumé types. The set of rules may be stored in any format, such as a table, linked list, and logic statements. Based on the set of rules, the résumé extraction engine identifies a segmentation analysis model that is associated with the résumé type. Alternatively, the résumé extraction engine determines that no segmentation analysis models are associated with the résumé type.

Different segmentation analysis models may be associated with different résumé types. As an example, segments of résumés in the software industry may be separated by headings that include capitalized letters. A support vector machine (which is described below with reference to Operation 206) may be suitable for detecting a heading based on capitalization. Therefore, the support vector machine would be a segmentation analysis model associated with the résumé type "Software."

In contrast, segments of résumés in the art industry may be distinguished based on font and/or graphics. A support vector machine may not be suitable for identifying a segment based on font and/or graphics. Therefore, the support vector machine would not be a segmentation analysis model associated with the résumé type "Art."

As another example, résumés in the software industry may commonly include keywords such as "Java" and "Ruby on Rails." A naïve Bayes classifier that is trained on a set of résumés in the software industry may be suitable for identifying the software-related keywords. By identifying the software-related keywords, the naïve Bayes classifier may determine a segment type of a segment of a résumé in the software industry. Therefore, the naïve Bayes classifier, trained on résumés in the software industry, would be a segmentation analysis model associated with the résumé type "Software."

In contrast, résumés in the art industry may commonly include keywords such as "painting" and "studio." A naïve Bayes classifier that is trained on a set of résumés in the art industry may be suitable for determining a segment type of a segment of a résumé in the art industry. Therefore, the naïve Bayes classifier, trained on résumés in the art industry, would be a segmentation analysis model associated with the résumé type "Art."

One or more embodiments include identifying a segment type of a segment of the résumé using the segmentation analysis model associated with the résumé type (Operation 206). The résumé extraction engine applies the segmentation analysis model to keywords and/or features of the résumé to identify a segment and/or to determine a segment type. The résumé extraction engine determines, keywords and/or features of the résumé, as described above with reference to Operation 202.

Different segmentation analysis models may be used to determine different segment types. As an example, a segmentation analysis model may be associated with the résumé type "Software." The segmentation analysis model may be used to determine segment types such as "Technical Skills" and "Prior Projects," but not "Art Shows." Another segmentation analysis model may be associated with the résumé type "Art," The segmentation analysis model may be used to determine segments types such as "Art. Shows," but not "technical Skills" and "Prior Projects."

In an embodiment, a résumé extraction engine applies a support vector machine to a résumé to identify a segment. The support vector machine determines whether each line of a résumé (also referred to herein as a "résumé line") is a beginning of a segment. The support vector machine is applied to a set of features associated with a particular résumé line, which is represented by a vector x. Examples of features include whether the résumé line includes a line divider, whether the résumé line includes capitalized text, and the number of characters included in the résumé line.

The support vector machine determines whether a résumé line is a beginning of a segment using weights generated based on a training set of résumés. Each line of each résumé the training set is known to be either a beginning of a segment or not a beginning of a segment. A set of features of each line of each résumé is also known.

The set of features of each résumé line in the training set is plotted on a graph to generate a set of training data points. A set of weights represented by a vector $w=[w_1, w_2, \ldots]$ is determined such that a linear (or nonlinear) curve that is a function of the weights w forms a hyperplane that maximizes the margins between the hyperplane and the training data points.

The set of features of the particular résumé line x is also plotted on the graph to generate a particular data point. If the particular data point is above the hyperplane, then the résumé extraction engine determines that the particular résumé line is a beginning of segment. If the particular data point is below the hyperplane, then the résumé extraction engine determines that the particular résumé line is not a beginning of a segment.

In an embodiment, a résumé extraction engine applies a naïve Bayes classifier to a particular segment to determine a segment type of the particular segment. A likelihood that the particular segment corresponds to a particular segment type is determined using frequency tables, as described above with reference to Operation 202. If the likelihood satisfies a specified criterion, then the résumé extraction engine determines the particular segment corresponds to the particular segment type.

In an embodiment, a résumé extraction engine applies an analysis model that identifies a keyword and/or feature of a particular segment type. The résumé extraction engine searches for the keyword and or feature in a particular segment of a résumé. If the résumé extraction engine identifies the keyword and/or feature in the particular segment, then the résumé extraction engine determines that the particular segment is of the particular segment type. If the résumé extraction engine does not identify the keyword and/or feature in the particular segment, then the résumé extraction engine determines that the particular segment is not of the particular segment type.

Additionally or alternatively, the résumé extraction engine may apply other analysis models to identify a segment type of a segment of the résumé.

One or more embodiments include selecting an extraction analysis model based on the résumé type and/or the segment type (Operation 208). The résumé extraction engine retrieves a set of rules from a data repository. The set of rules indicates a mapping between (a) extraction analysis models and (b) résumé types and/or segment types. Based on the set of rules, the résumé extraction engine identifies an extraction analysis model based on the résumé type determined at Operation 202 and/or the segment type determined at Operation 206.

Different extraction analysis models may be associated with different résumé types. As an example, organizations listed in résumés in the public, services sector may commonly end with the word "Services," such as "United States Forest Service," and "United States Postal Service," An analysis model that is trained on a set of résumés in the public services sector may be able to identify features characterizing public service organizations. Based on identifying, the features characterizing public service organizations, the analysis model may be suitable for extracting organizations listed in a résumé in the public services sector. Therefore, the analysis model would be associated with the résumé type "Public Services."

In contrast, organizations listed in résumés in the legal industry may commonly end with the characters "LLP." "LLP" is an abbreviation for "Limited Liability Partnership," which, is, a common form of incorporation of law firms. An analysis model that is trained on a set of résumés in the legal industry may be able to identify features characterizing law firms. Based on identifying features characterizing law firms, the analysis model may be suitable for extracting law firms listed in a résumé in the legal industry. Therefore, the analysis model would be associated with the résumé type "Legal."

As another example, a résumé may correspond to the résumé type "Europe," Résumés of the résumé type "Europe" may conform to a specific format. The specific format may specify a résumé line for each piece of information. For example, the first résumé line includes a person's first name, and the second résumé line includes a person's last name. A rule-based model that applies the specific format to a particular résumé may be used. The rule-based model may specify that the first name is to be extracted from the first résumé line, and the last name is to be extracted from the second résumé line. Therefore, the rule-based model would be associated with the résumé type "Europe."

Different extraction analysis models may be associated with different segment types. As an example, dates may be included in an "Education" segment of a résumé, but not in a "Personal Information" segment of the résumé. Dates may be expressed in a specific format. Specifically, dates may be expressed as six digits, which includes a two-digit day, a two-digit month, and a two-digit year. A regular expression model (which is discussed below with reference to Operation 210) may use a particular regular expression for identifying the specific format associated with dates. The regular expression model may be suitable for identifying dates in the "Education" segment. Therefore, the regular expression model would be an extraction analysis model associated with the segment type "Education." However, the regular expression model would not be suitable for identifying information in the "Personal Information" segment. The regular expression model would not be an extraction analysis model associated with the segment type "Personal Information."

One or more embodiments include identifying a résumé value, in the segment, corresponding to a résumé attribute using the extraction analysis model (Operation 210). The résumé extraction engine applies the extraction analysis model to keywords and/or features of the résumé to identify a résumé value corresponding to a résumé attribute. The résumé extraction engine determines keywords and/or features of the résumé, as described above with reference to Operation 202.

The résumé extraction engine may use an analysis model that identities a résumé value corresponding to a résumé attribute based on a résumé type of the résumé. As an example, an analysis model may indicate that the word "Java" found in a résumé in the software industry corresponds to a résumé attribute "Programming Languages." The analysis model may indicate that the word "Java" found in a résumé in the service industry corresponds to a résumé attribute "Description of Work Experience."

The résumé extraction engine may use an analysis model that identifies a résumé value corresponding to a résumé attribute based on a segment type of a particular segment of the résumé. The particular segment includes the identified résumé value. As an example, an analysis model may indicate that a date found in an "Education" segment of a résumé corresponds to a résumé attribute "Graduation Date." The analysis model may indicate that a date found in a "Work Experiences" segment of a résumé corresponds to a résumé attribute "Job Start Date" or "Job End Date."

In an embodiment, a résumé extraction engine applies a regular expression model to a résumé to identify a résumé value corresponding to a résumé attribute. The regular expression model uses a regular expression (also referred to herein as a "regex") to analyze a résumé. The regex specifies a specific format and/or pattern that is used to express a particular piece of information in text. The résumé extraction engine compares the regex to a string of text in the résumé to determine whether there is a match. If there is a match, then the résumé extraction engine determines that the string of text includes the particular piece of information. The résumé extraction engine determines that the particular piece of information corresponds to a particular résumé attribute.

As an example, dates may be expressed as six digits, including a two-digit day, a two-digit month, and a two-digit year. A regex for dates may be [dd/dd/dd], wherein "d" represents any digit. A string of text in a résumé that matches the regex would be determined as a date. If the date appears in an "Education" segment of the résumé, for example, then the résumé extraction engine may determine that the date corresponds to a résumé attribute "Graduation Date."

As another example, email addresses may be expressed as a string of text including "@" and ".com." A regex for emails may be ["@"$ ".com"], wherein "$" represents any set of characters. A string of text that matches the regex would be determined as an email address. The résumé extraction engine may determine that the email address corresponds to a résumé attribute "Email Address."

In an embodiments a résumé extraction engine applies a dictionary look-up model to a résumé to identify a résumé value corresponding to a résumé attribute. The dictionary look-up model uses a dictionary to analyze a résumé. The dictionary includes a list of keywords. The dictionary indicates that a particular keyword corresponds to a particular résumé attribute. The résumé extraction engine compares keywords in the dictionary to a string of text in the résumé to determine whether there is a match. If there is a match with a particular keyword corresponding to a particular résumé attribute, then the résumé extraction engine determines that the string of text corresponds to the particular résumé attribute.

As an example, a dictionary may indicate that a keyword "Stanford University" corresponds to a résumé attribute "Undergraduate School." The résumé extraction engine may determine that a string of text in a résumé matches the keyword "Stanford University." The résumé extraction engine may identify the résumé value "Stanford University" as corresponding to the résumé attribute "Undergraduate School."

In an embodiment, a résumé extraction engine applies an analysis model that identifies a keyword and/or feature that corresponds to a particular résumé attribute. The résumé extraction engine searches for the keyword and/or feature in a résumé. If the résumé extraction engine identifies the keyword and/or feature in a string of text of the résumé, then the résumé extraction engine determines that the string of text is a résumé value corresponding to the particular résumé attribute. Additionally or alternatively, the résumé extraction engine may apply other analysis models to identify a résumé value corresponding to a résumé attribute.

One or more embodiments include storing the résumé value in association with the résumé attribute (Operation 212). The résumé extraction engine may store the résumé value in association with the résumé attribute in any form, such as a table, linked list, or array.

The résumé extraction engine may identity multiple résumé values, each corresponding to a different résumé attribute, from a same résumé. The résumé extraction engine generates a profile corresponding to the résumé. The profile includes the résumé attributes. The résumé extraction engine stores the multiple résumé values in association with the résumé attributes of the profile.

As an example, a résumé may include the text, "John Smith, New York University, May 2010." A résumé extraction engine may generate a profile for the résumé. The profile may include the résumé attributes "Name," "Undergraduate School," and "Graduation Date." The résumé extraction engine may store the résumé value "John Smith" in association with "Name." The résumé extraction engine may store the résumé value "New York University" in association with "Undergraduate School." The résumé extraction engine may store the résumé value "May 2010" in association with "Graduation Date." The profile would then include "Name: John Smith; Undergraduate School: New York University; Graduation Date: May 2010."

The résumé extraction engine may determine a representation of the résumé value, and store the representation of the résumé value in association with the résumé attribute. As an example, a résumé may include the text, "B.A." The résumé extraction engine may identify the résumé value "B.A." corresponding to the résumé attribute "Degree." The résumé extraction engine may determine that "B.A." is an abbreviation for "Bachelor of Arts." The résumé extraction engine may store "Bachelor of Arts" (rather than "B.A.") in association with the résumé attribute "Degree."

The résumé extraction engine may determine a representation of the résumé value from a limited set of values that may be assumed by a résumé attribute. As an example, a résumé attribute may be "Degree." The "Degree" résumé attribute may be limited to assuming only the following values: "Bachelor of Science" and "Bachelor of Arts." If a résumé extraction engine identifies a résumé value "B.A." in a résumé, the résumé extraction engine maps the résumé value "B.A." to one of the limited set of values that may be assumed by the résumé attribute "Degree." The résumé extraction engine may determine that "Bachelor of Arts" is a representation of "B.A." The résumé extraction engine may store "Bachelor of Arts" in association with the résumé attribute "Degree."

4. Example Embodiment

Figure 3:
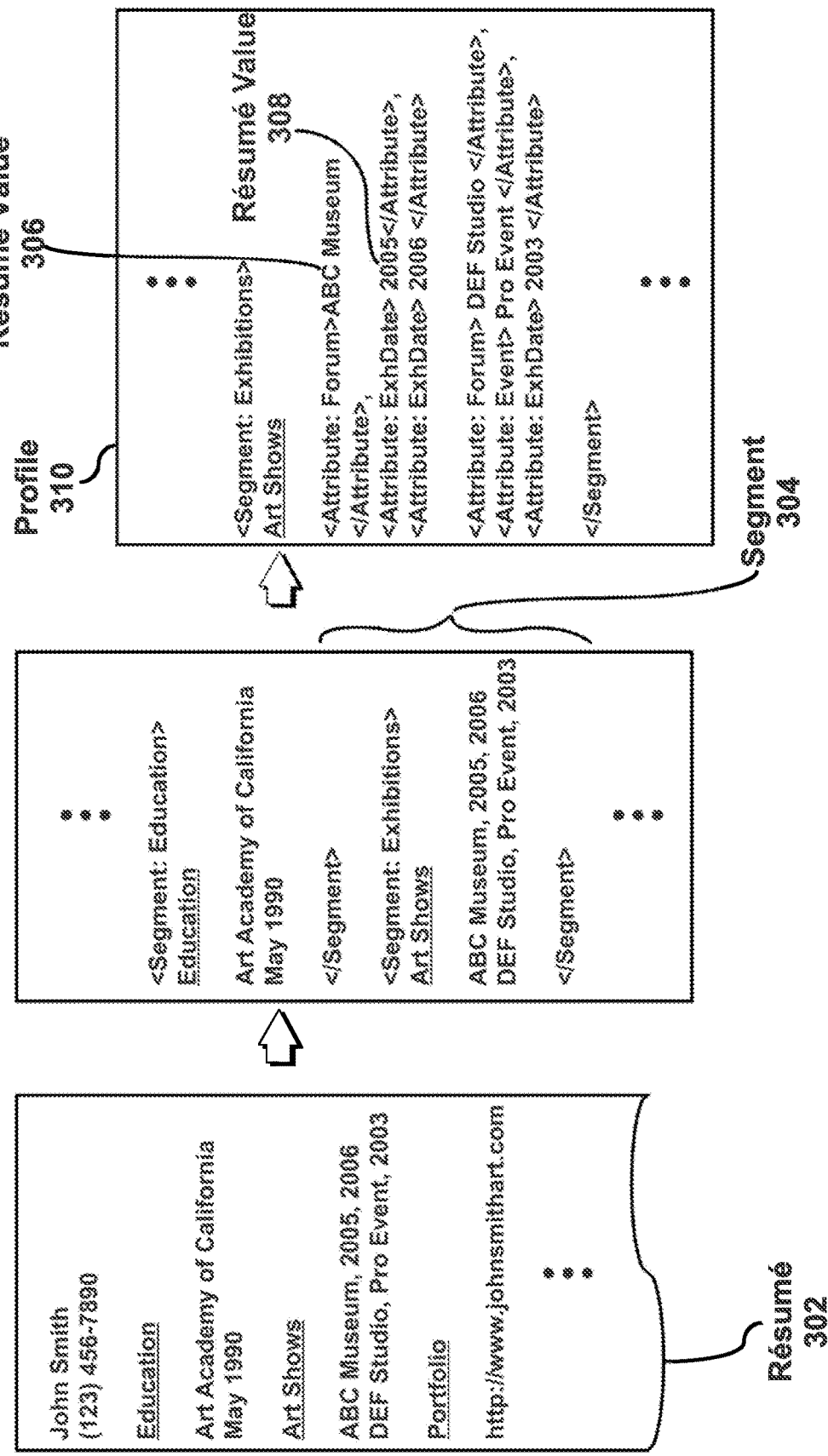
FIG. 3 illustrates an example for extracting a résumé value corresponding to a résumé attribute based on a résumé type, in accordance with one or more embodiments.

A detailed example is described below for purposes of clarity. Components and/or operations described below should be understood as one specific example which may not be applicable to certain embodiments. Accordingly, components and/or operations described below should not be construed as limiting the scope of any of the claims. FIG. 3 illustrates an example for extracting a résumé value corresponding to a résumé attribute based on a résumé type, in accordance with one, or more embodiments.

A résumé extraction engine receives résumé 302 from an application. The résumé extraction engine determines a résumé type of résumé 302. The résumé extraction engine identifies keywords of résumé 302, including "Art Academy," "Art Shows," "Museum, and "Studio." The résumé extraction engine applies a naïve Bayes classifier to the keywords of résumé 302. Based on the naïve Bayes classifier, the résumé extraction engine determines that résumé 302 corresponds to the résumé type "Art."

The résumé extraction engine selects a segmentation analysis model associated with the résumé type "Art." The résumé extraction engine retrieves a table from a data repository. The table indicates that a particular support vector machine and a particular naïve Bayes classifier are associated with the résumé type "Art" The particular support vector machine and the particular naïve Bayes classifier were generated based a training set of résumés that also correspond to the résumé type "Art."

The résumé extraction engine applies the particular support vector machine to identify segments of résumé 302, including segment 304. The résumé extraction engine identifies keywords of segment 304, including "Museum" and "Studio." The résumé extraction engine applies the particular naïve Bayes classifier to the keywords of segment 304 to determine a segment type of segment 304. Based on the particular naïve Bayes classifier, the résumé extraction engine determines that segment 304 corresponds to the segment type "Exhibitions."

The résumé extraction engine selects an extraction analysis model based on the résumé type "Art" and the segment type "Exhibitions" to identify a résumé value, in segment 304, corresponding to a résumé attribute. The résumé extraction engine retrieves a table from a data repository. The table indicates that a particular dictionary look-up model is associated with the résumé type "Art" and the segment type "Exhibitions." The particular dictionary look-up model uses a dictionary that includes names of forums at which artwork may be exhibited, such as "ABC Museum" and "DEF Studio." The table also indicates that a particular regular expression model is associated with the segment type "Exhibitions." The particular regular expression model includes a regex for identifying dates.

The résumé extraction engine applies the particular dictionary look-up model to identify a résumé value, in segment 304, corresponding to a résumé attribute. The résumé extraction engine determines that résumé value 306, "ABC Museum," matches a name of a forum included in the dictionary. The résumé extraction engine determines that résumé value 306 corresponds to the résumé attribute "Forum."

The résumé extraction engine applies the particular regular expression model to identify a résumé value, in segment 304, corresponding to a résumé attribute. The résumé extraction engine determines that résumé value 308, "2005," matches a format of a date, specifically four consecutive digits. Since the date is included in the "Exhibitions" segment, the résumé extraction engine determines that résumé value 308 corresponds to the résumé attribute "Exhibition Date."

The résumé extraction engine stores identified résumé values in association with résumé attributes. The résumé extraction engine generates a profile 310 associated with résumé 302. The résumé extraction engine stores résumé value 306, "ABC Museum," in association with the résumé attribute "Forum" of profile 310. The résumé extraction engine stores résumé value 308, "2005," in association with the résumé attribute "Exhibition Date" of profile 310. Hence profile 310 includes "<Attribute: Forum> ABC Museum </Attribute>; <Attribute: ExhDate> 2005</Attribute>."

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
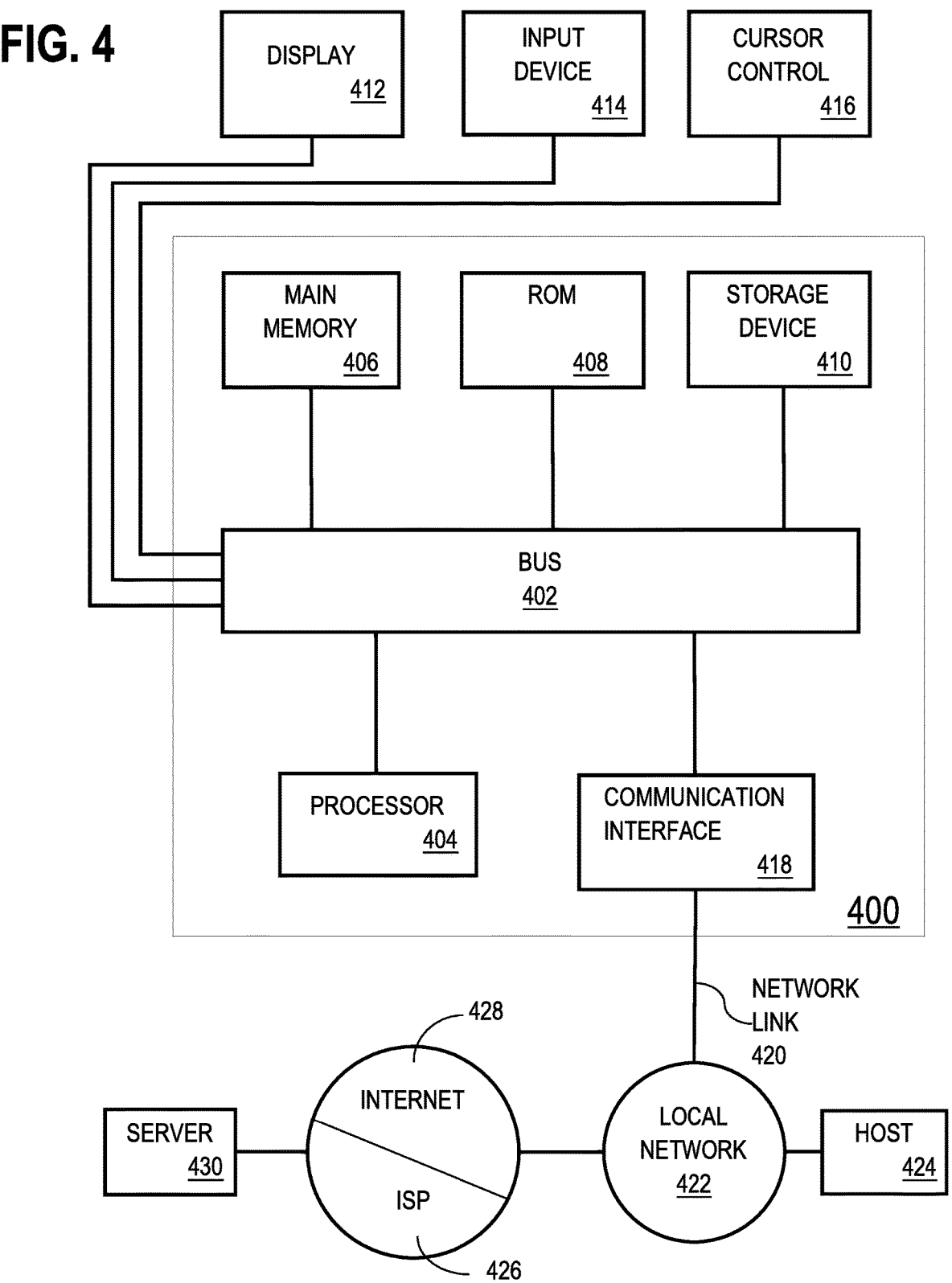
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and or volatile media. Non-volatile media includes, for example, optical or magnetic disks, such as storage device 410. Volatile media includes dynamic memory, such as main memory 406. Common forms of storage media include, for example, a floppy disk, a flexible disk, hard, disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from Which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modern to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a sever 430 might transmit a requested code for an application program through. Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific thrill in which such claims issue, including any subsequent correction.

What is claimed is:

1. A non-transitory computer readable medium comprising instructions which, when executed by one or more hardware processors, causes performance of operations comprising:
   obtaining a first résumé associated with a first user;
   obtaining a first set of information that is external to and associated with the first résumé,
      wherein obtaining the first set of information comprises one or more of:
         identifying a geographical region of the first user, as the first set of information, from a first user profile separate from the first resume;
         identifying a job type sought by the first user, as the first set of information, based on the first user profile separate from the first resume; or
         identifying a job posting, as the first set of information, for which the first resume is submitted;
   based on the first set of information, determining a first résumé type, of a plurality of résumé types, corresponding to the first résumé;
   selecting a first analysis model, of a plurality of analysis models, based on the first résumé type corresponding to the first résumé, wherein each of the plurality of analysis models is associated with a respective résumé type;
   applying the first analysis model to extract, from the first résumé, a first résumé value corresponding to a first résumé attribute associated with the first résumé type;
   storing the first résumé value, or a representation of the first résumé value, in association with the first résumé attribute of a first résumé profile;
   obtaining a second résumé associated with a second user;
   obtaining a second set of information that is external to and associated with the second résumé;
   based on the second set of information, determining a second résumé type, of the plurality of résumé types, corresponding to the second résumé;
   selecting a second analysis model, of the plurality of analysis models, based on the second résumé type corresponding to the second résumé;
   applying the second analysis model to extract, from the second résumé, a second résumé value corresponding to a second résumé attribute associated with the second résumé type, wherein the first analysis model and the second analysis model are different; and
   storing the second résumé value, or a representation of the second résumé value, in association with the second résumé attribute of a second résumé profile.

2. The medium of claim 1, wherein analyzing the first résumé based on the first analysis model comprises identifying the first résumé value for associating with the first résumé attribute corresponding to the first analysis model.

3. The medium of claim 1, wherein analyzing the first résumé based on the first analysis model comprises identifying a segment for associating with a segment type corresponding to the first analysis model.

4. The medium of claim 1, wherein determining the first résumé type corresponding to the first résumé comprises applying a probabilistic model to one or more keywords in the first résumé.

5. The medium of claim 4, wherein applying the probabilistic model to the one or more keywords in the first résumé comprises:
  determining a statistical distribution of the one or more keywords in the first résumé;
  determining a first number of résumé s in a training set;
  determining a second number of résumé s of the first résumé type in the training set;
  determining a third number of résumé s associated with the statistical distribution of the one or more keywords in the training set;
  determining a fourth number of résumé s of the first résumé s type and associated with the statistical distribution of the one or more keywords in the training set;
  determining a likelihood that the first résumé is of the first résumé type based on the first number of résumé s, the second number of résumé s, the third number of résumé s, and the fourth number of résumé s; and
  responsive to determining that the likelihood is above a threshold value: determining that the first résumé type corresponds to the first résumé.

6. The medium of claim 1, wherein the operations further comprise:
  determining a third résumé type corresponding to the first résumé,
  wherein the first analysis model is selected based on the first résumé type and the third résumé type corresponding to the first résumé.

7. The medium of claim 1, wherein the first résumé type corresponding to the first résumé is a first industry and the second résumé type corresponding to the second résumé is a second industry.

8. The medium of claim 1, wherein each of the plurality of analysis models comprises different algorithms.

9. The medium of claim 1, wherein each of the plurality of analysis models comprises a particular algorithm that uses different parameters.

10. The medium of claim 1, wherein the first analysis model is generated based on a set of résumé s corresponding to the first résumé type.

11. The medium of claim 1, wherein:
  determining the first résumé type corresponding to the first résumé comprises applying a probabilistic model to one or more keywords or features in the first résumé;
  analyzing the first résumé based on the first analysis model comprises:
    identifying a segment for associating with a segment type corresponding to the first analysis model;
    identifying the first résumé value for associating with the first résumé attribute based on the segment type;
  the first analysis model is selected based on the first résumé type and a third résumé type corresponding to the first résumé;
  the first résumé type corresponding to the first résumé is a first industry and the second résumé type corresponding to the second résumé is a second industry;
  at least two of the plurality of analysis models comprises different algorithms;
  at least two of the plurality of analysis models comprises a particular algorithm that uses different parameters;
  the first analysis model is generated based on a set of résumé s corresponding to the first résumé type;
  the operations further comprise:
    determining the representation of the first résumé value; and
    storing the representation of the first résumé value in association with the first résumé attribute.

12. The medium of claim 1, wherein the first set of information comprises one or more of:
  characteristics associated with the first user; and
  characteristics associated with a job for which the first resume is submitted.

13. The medium of claim 1, wherein obtaining the first of information comprises identifying the geographical region of the first user, as the first set of information, from the first user profile separate from the first resume.

14. The medium of claim 1, wherein obtaining the first of information comprises identifying the job type sought by the first user, as the first set of information, based on the first user profile separate from the first resume.

15. The medium of claim 1, wherein obtaining the first of information comprises identifying the job posting, as the first set of information, for which the first resume is submitted.

16. A method, comprising:
  obtaining a first résumé associated with a first user;
  obtaining a first set of information that is external to and associated with the first résumé,
    wherein obtaining the first set of information comprises one or more of:
      identifying a geographical region of the first user, as the first set of information, from a first user profile separate from the first resume;
      identifying a job type sought by the first user, as the first set of information, based on the first user profile separate from the first resume; or
      identifying a job posting, as the first set of information, for which the first resume is submitted;
  based on the first set of information, determining a first résumé type, of a plurality of résumé types, corresponding to the first résumé;
  selecting a first analysis model, of a plurality of analysis models, based on the first résumé type corresponding to the first résumé, wherein each of the plurality of analysis models is associated with a respective résumé type;
  applying the first analysis model to extract, from the first résumé, a first résumé value corresponding to a first résumé attribute associated with the first résumé type;
  storing the first résumé value, or a representation of the first résumé value, in association with the first résumé attribute of a first résumé profile;
  obtaining a second résumé associated with a second user;
  obtaining a second set of information that is external to and associated with the second résumé;
  based on the second set of information, determining a second résumé type, of the plurality of résumé types, corresponding to the second résumé;
  selecting a second analysis model, of the plurality of analysis models, based on the second résumé type corresponding to the second résumé;
  applying the second analysis model to extract, from the second résumé, a second résumé value corresponding to a second résumé attribute associated with the second résumé type, wherein the first analysis model and the second analysis model are different;
  storing the second résumé value, or a representation of the second résumé value, in association with the second résumé attribute of a second résumé profile;

wherein the method is performed by at least one hardware device including a processor.

17. The method of claim 16, wherein analyzing the first résumé based on the first analysis model comprises identifying the first résumé value for associating with the first résumé attribute corresponding to the first analysis model.

18. A system, comprising:
at least one hardware device including a processor; and
the system configured to perform operations comprising:
obtaining a first résumé associated with a first user;
obtaining a first set of information that is external to and associated with the first résumé,
wherein obtaining the first set of information comprises one or more of:
identifying a geographical region of the first user, as the first set of information, from a first user profile separate from the first resume;
identifying a job type sought by the first user, as the first set of information, based on the first user profile separate from the first resume; or
identifying a job posting, as the first set of information, for which the first resume is submitted;
based on the first set of information, determining a first résumé type, of a plurality of résumé types, corresponding to the first résumé;
selecting a first analysis model, of a plurality of analysis models, based on the first résumé type corresponding to the first résumé, wherein each of the plurality of analysis models is associated with a respective résumé type;
applying the first analysis model to extract, from the first résumé, a first résumé value corresponding to a first résumé attribute associated with the first résumé type;
storing the first résumé value, or a representation of the first résumé value, in association with the first résumé attribute of a first résumé profile;
obtaining a second résumé associated with a second user;
obtaining a second set of information that is external to and associated with the second résumé;
based on the second set of information, determining a second résumé type, of the plurality of résumé types, corresponding to the second résumé;
selecting a second analysis model, of the plurality of analysis models, based on the second résumé type corresponding to the second résumé;
applying the second analysis model to extract, from the second résumé, a second résumé value corresponding to a second résumé attribute associated with the second résumé type, wherein the first analysis model and the second analysis model are different;
storing the second résumé value, or a representation of the second résumé value, in association with the second résumé attribute of a second résumé profile.

19. The system of claim 18, wherein the first set of information comprises one or more of:
characteristics associated with the first user; and
characteristics associated with a job for which the first resume is submitted.

* * * * *

UNITED STATES PATENT AND TRADEMARK OFFICE
CERTIFICATE OF CORRECTION

PATENT NO. : 10,643,182 B2
APPLICATION NO. : 15/072256
DATED : May 5, 2020
INVENTOR(S) : Cengiz et al.

Page 1 of 3

It is certified that error appears in the above-identified patent and that said Letters Patent is hereby corrected as shown below:

On the Title Page

On page 2, Column 2, item (56) under Other Publications, Line 2, delete "retreived" and insert -- retrieved --, therefor.

In the Specification

In Column 1, Line 43, delete "embodiments:" and insert -- embodiments; --, therefor.

In Column 1, Line 45, delete "value," and insert -- value --, therefor.

In Column 3, Line 34, delete "I 18" and insert -- 118 --, therefor.

In Column 3, Line 50, delete "type." and insert -- type, --, therefor.

In Column 4, Line 19, delete ""University of California"" and insert -- "University of California". --, therefor.

In Column 5, Line 13, delete "segment, type" and insert -- segment type --, therefor.

In Column 6, Line 61, delete "Wong." and insert -- Wong, --, therefor.

In Column 6, Line 61, delete "Boston University,"" and insert -- Boston University." --, therefor.

In Column 9, Line 21, delete "set," and insert -- set --, therefor.

In Column 10, Line 3, delete "determines," and insert -- determines --, therefor.

In Column 10, Line 13, delete ""Art,"" and insert -- "Art." --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*

In Column 10, Line 14, delete ““Art.” and insert -- “Art --, therefor.

In Column 10, Line 15, delete ““technical” and insert -- “Technical --, therefor.

In Column 10, Line 28, after "résumé" insert -- in --.

In Column 10, Line 35, delete "nonlinear)" and insert -- non-linear) --, therefor.

In Column 10, Line 59, delete "and or" and insert -- and/or --, therefor.

In Column 11, Line 16, delete "public," and insert -- public --, therefor.

In Column 11, Line 19, delete "Service,"" and insert -- Service." --, therefor.

In Column 11, Lines 22-23, delete "identifying," and insert -- identifying --, therefor.

In Column 11, Line 31, delete "which, is," and insert -- which is --, therefor.

In Column 11, Line 40, delete ““Europe,”" and insert -- “Europe." --, therefor.

In Column 12, Line 14, delete "identities" and insert -- identifies --, therefor.

In Column 12, Line 61, delete "embodiments" and insert -- embodiment, --, therefor.

In Column 13, Line 19, delete "identities" and insert -- identifies --, therefor.

In Column 13, Line 31, delete "identity" and insert -- identify --, therefor.

In Column 14, Line 20, delete "one," and insert -- one --, therefor.

In Column 14, Line 35, delete ““Art”" and insert -- “Art." --, therefor.

In Column 16, Line 60, delete "and or" and insert -- and/or --, therefor.

In Column 16, Line 65, delete "hard," and insert -- hard --, therefor.

In Column 17, Line 24, delete "Which" and insert -- which --, therefor.

In Column 17, Line 34, delete "modern" and insert -- modem --, therefor.

In Column 17, Line 47, delete "(ISP" and insert -- (ISP) --, therefor.

In Column 17, Line 60, delete "sever" and insert -- server --, therefor.

In Column 17, Line 61, delete "through." and insert -- through --, therefor.

CERTIFICATE OF CORRECTION (continued)
U.S. Pat. No. 10,643,182 B2

In Column 18, Line 8, delete "thrill" and insert -- form --, therefor.

In the Claims

In Column 19, Line 10, in Claim 5, delete "résumé s" and insert -- résumés --, therefor.

In Column 19, Line 11, in Claim 5, delete "résumé s" and insert -- résumés --, therefor.

In Column 19, Line 13, in Claim 5, delete "résumé s" and insert -- résumés --, therefor.

In Column 19, Line 16, in Claim 5, delete "résumé s" and insert -- résumés --, therefor.

In Column 19, Line 17, in Claim 5, delete "résumé s" and insert -- résumés --, therefor.

In Column 19, Line 20, in Claim 5, delete "résumé s," and insert -- résumés, --, therefor.

In Column 19, Line 21, in Claim 5, delete "résumé s," and insert -- résumés, --, therefor.

In Column 19, Lines 21-22, in Claim 5, delete "résumé s," and insert -- résumés, --, therefor.

In Column 19, Line 22, in Claim 5, delete "résumé s;" and insert -- résumés; --, therefor.

In Column 19, Line 43, in Claim 10, delete "résumé s" and insert -- résumés --, therefor.

In Column 19, Line 66, in Claim 11, delete "résumé s" and insert -- résumés --, therefor.

In Column 20, Line 10, in Claim 13, after "first" insert -- set --.

In Column 20, Line 14, in Claim 14, after "first" insert -- set --.

In Column 20, Line 19, in Claim 15, after "first" insert -- set --.